(12) United States Patent
Ma et al.

(10) Patent No.: US 10,042,233 B2
(45) Date of Patent: Aug. 7, 2018

(54) INTELLIGENT ADJUSTMENT METHOD WHEN VIDEO CAMERA PERFORMS AUTOMATIC EXPOSURE AND APPARATUS THEREFOR

(71) Applicant: HANGZHOU HIKVISION DIGITAL TECHNOLOGY CO., LTD., Hangzhou, Zhejiang (CN)

(72) Inventors: Weimin Ma, Zhejiang (CN); Can You, Zhejiang (CN)

(73) Assignee: HANGZHOU HIKVISION DIGITAL TECHNOLOGY CO., LTD., Hangzhou, Zhejiang (CN)

( * ) Notice: Subject to any disclaimer, the term of this patent is extended or adjusted under 35 U.S.C. 154(b) by 40 days.

(21) Appl. No.: 15/314,028

(22) PCT Filed: Aug. 20, 2014

(86) PCT No.: PCT/CN2014/084860
§ 371 (c)(1),
(2) Date: Nov. 25, 2016

(87) PCT Pub. No.: WO2015/180268
PCT Pub. Date: Dec. 3, 2015

(65) Prior Publication Data
US 2017/0212408 A1 Jul. 27, 2017

(30) Foreign Application Priority Data
May 30, 2014 (CN) .......................... 2014 1 0243155

(51) Int. Cl.
*G03B 7/20* (2006.01)
*G03B 7/00* (2014.01)
(Continued)

(52) U.S. Cl.
CPC ............ *G03B 7/20* (2013.01); *G03B 7/003* (2013.01); *G03B 7/006* (2013.01); *G06T 7/248* (2017.01);
(Continued)

(58) Field of Classification Search
CPC .......... G03B 7/20; G03B 7/003; G03B 7/006; G03B 7/097; G03B 2217/005;
(Continued)

(56) References Cited

U.S. PATENT DOCUMENTS

| 4,945,380 A | 7/1990 | Katoh et al. |
| 6,088,534 A * | 7/2000 | Tominaga ................ G03B 7/20 |
| | | 396/449 |

(Continued)

FOREIGN PATENT DOCUMENTS

| CN | 101873437 A | 10/2010 |
| CN | 102478743 A | 5/2012 |

(Continued)

OTHER PUBLICATIONS

International Search Report, dated Feb. 9, 2015, International Patent Application No. PCT/CN2014/084860 with English translation (5 pages).

(Continued)

*Primary Examiner* — Pritham Prabhakher
(74) *Attorney, Agent, or Firm* — Hamre, Schumann, Mueller & Larson, P.C.

(57) ABSTRACT

The present invention relates to the field of video camera image processing. Disclosed are an intelligent adjustment method when a video camera performs automatic exposure and an apparatus therefor. In the present invention, a first corresponding relationship between a rate and an aperture is pre-set. The first corresponding relationship records corresponding upper and lower aperture limits required by each (Continued)

rate for achieving the best depth of field of an image. The method comprises the following steps: acquiring the current rate of a video camera; searching for upper and lower aperture limits corresponding to the current rate in a first corresponding relationship; if the current aperture value exceeds the range of the searched upper and lower aperture limits corresponding to the current rate, adjusting the current aperture value to be within the range of the upper and lower aperture limits; and according to the adjusted aperture value, adjusting exposure time and gain to satisfy the need of image brightness. In the present invention, according to different field scenario rates, the aperture is adjusted to be within the aperture range corresponding to the best depth of field so as to acquire the best depth of field, and a shutter and gain are adjusted accordingly, so that the best brightness can be ensured and the best depth of field is achieved at the same time so as to improve image quality.

10 Claims, 2 Drawing Sheets

(51) Int. Cl.
*G06T 7/246* (2017.01)
*H04N 5/235* (2006.01)
*H04N 5/232* (2006.01)
*H04N 5/243* (2006.01)

(52) U.S. Cl.
CPC ......... *H04N 5/2327* (2013.01); *H04N 5/2351* (2013.01); *H04N 5/2352* (2013.01); *H04N 5/2353* (2013.01); *H04N 5/23254* (2013.01); *H04N 5/23296* (2013.01); *H04N 5/243* (2013.01)

(58) Field of Classification Search
CPC .... G06T 7/248; H04N 5/2353; H04N 5/2351; H04N 5/2352; H04N 5/2354; H04N 5/23296; H04N 5/243; H04N 5/2327; H04N 5/232; H04N 5/262; H04N 5/235; H04N 5/23212

USPC ...................................................... 348/221.1
See application file for complete search history.

(56) References Cited

U.S. PATENT DOCUMENTS

| | | | | |
|---|---|---|---|---|
| 7,292,280 | B2* | 11/2007 | Yamazaki | H04N 5/23212 348/221.1 |
| 9,001,258 | B2* | 4/2015 | Shiohara | H04N 5/2353 348/347 |
| 9,122,129 | B2* | 9/2015 | Hamamura | G03B 13/24 |
| 2007/0092244 | A1* | 4/2007 | Pertsel | H04N 5/23248 396/153 |
| 2008/0101786 | A1* | 5/2008 | Pozniansky | H04N 5/2354 396/159 |
| 2010/0231738 | A1* | 9/2010 | Border | H04N 5/232 348/222.1 |
| 2010/0310246 | A1* | 12/2010 | Campbell | G03B 7/085 396/89 |
| 2011/0221930 | A1* | 9/2011 | Katsumata | H04N 5/23248 348/226.1 |
| 2012/0320253 | A1* | 12/2012 | Park | H04N 5/23212 348/345 |
| 2012/0327267 | A1* | 12/2012 | Takahara | G02B 7/34 348/231.99 |
| 2013/0120639 | A1 | 5/2013 | Maeda | |
| 2013/0128098 | A1* | 5/2013 | Hamamura | G03B 13/24 348/346 |
| 2013/0148013 | A1* | 6/2013 | Shiohara | H04N 5/2353 348/362 |
| 2013/0208148 | A1 | 8/2013 | Osawa | |
| 2014/0240585 | A1* | 8/2014 | Takahara | G02B 7/34 348/345 |

FOREIGN PATENT DOCUMENTS

| | | |
|---|---|---|
| CN | 103108135 A | 5/2013 |
| CN | 103259974 A | 8/2013 |
| JP | 02153330 A | 6/1990 |

OTHER PUBLICATIONS

Supplemental European Search Report dated Apr. 10, 2017 for corresponding European Application No. 14893321.1, 7 pages.

* cited by examiner

```
{0,            0.651183,       0.721183},
{7836,         0.651183,       0.721183},
{7500,         0.636667,       0.701183},
{8300,         0.587361,       0.641183},
{9004,         0.468481,       0.541183},
{9237,         0.468481,       0.518681},
{10036,        0.408922,       0.441884},
{10500,        0.408922,       0.402484},
{10700,        0.329616,       0.362924},
```
FIG. 3
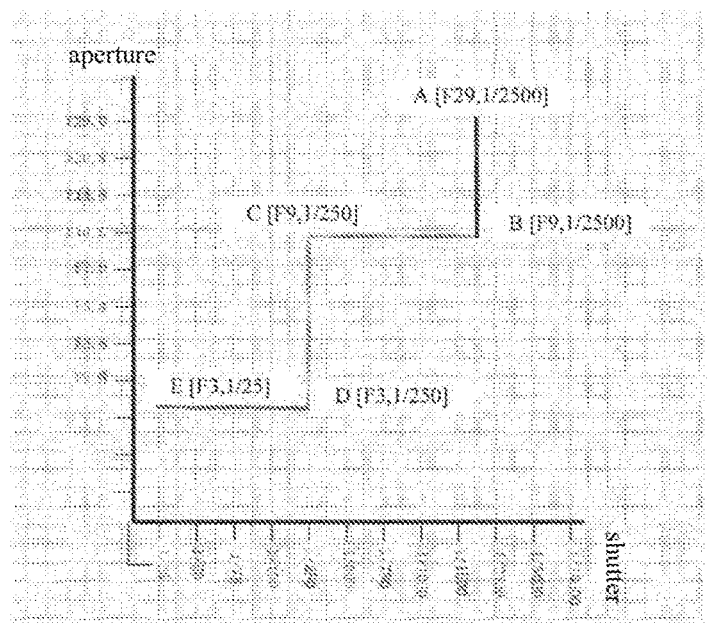
FIG. 4
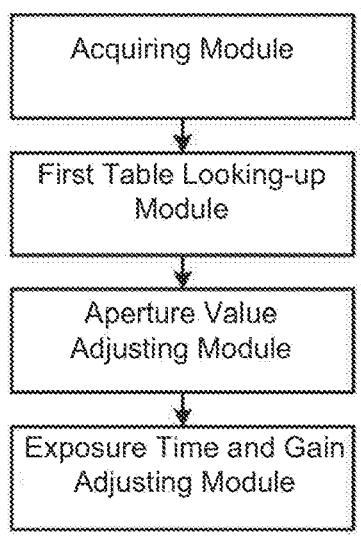
FIG. 5

INTELLIGENT ADJUSTMENT METHOD WHEN VIDEO CAMERA PERFORMS AUTOMATIC EXPOSURE AND APPARATUS THEREFOR

FIELD OF THE INVENTION

The present invention relates to the field of image processing of a video camera, particularly relates to an intelligent adjustment method for automatic exposure performed by a video camera and apparatus therefor.

BACKGROUND OF THE INVENTION

The prior art and the work process are: AE (i.e. "Automatic Exposure") algorithm in the 3A algorithm, and current AE algorithm implements changes of brightness by driving aperture, shutter and gain so as to eventually achieve the optimal brightness where the brightness can be identified by human eyes for different scenes.

The control principle of the AE algorithm is: setting a reference brightness A, changing a brightness cY in a real-time scene by controlling aperture, exposure time and gain (these three are referred to as module variables hereafter) and acquiring the brightness cY which is marked as B in real time, and ending the AE control when B value equals to A value; wherein the relationship between the aperture and cY is that the bigger the aperture, the greater cY, and the smaller the aperture, the smaller cY; similarly, the greater the exposure time or the gain, the greater cY, and the smaller the exposure time or the gain, the smaller cY; and based on the relationships between the module variables and cY, AE implements controlling module variables in different scenes so that image variables reach the optimal brightness which is identified by human eyes.

Nevertheless, current AE algorithm exists some deficiencies on ensuring optimal shutter and optimal depth of field (optimal aperture) when ensuring optimal brightness, and following problems would appear:

Problem 1. Image jittering under a high magnification;
Problem 2. Monitored vehicle's tailing in road scene; Problem 3. Image blurring caused by too small depth of field in evening scene, etc.

SUMMARY OF THE INVENTION

The purpose of the present invention is to provide an intelligent adjustment method for automatic exposure performed by a video camera and apparatus therefor, wherein aperture is adjusted to be within aperture ranges corresponding to an optimal depth of field according to different scene magnifications in order to acquire the optimal depth of field, and shutter and gain are adjusted accordingly, so that the optimal depth of field can be reached while the optimal brightness is ensured to improve image quality.

In order to solve the above technical problem, one embodiment of the present invention discloses an intelligent adjustment method for automatic exposure performed by a video camera, a first corresponding relationship between magnifications and apertures is pre-set in the video camera, and the first corresponding relationship records corresponding upper and lower aperture limits required for reaching an optimal depth of field of an image under each magnification, the method comprising:

acquiring a current magnification of a video camera;

searching for upper and lower aperture limits corresponding to the current magnification in the first corresponding relationship based on the current magnification;

adjusting a current aperture value to be within a range of the upper and lower aperture limits corresponding to the current magnification if the current aperture value exceeds the found range of the upper and lower aperture limits; and adjusting exposure time and gain based on the adjusted aperture value to meet requirements of image brightness.

Another embodiment of the present invention further discloses an intelligent adjustment apparatus for automatic exposure performed by a video camera, a first corresponding relationship between magnifications and apertures is pre-set in the video camera, and the first corresponding relationship records corresponding upper and lower aperture limits required for reaching an optimal depth of field of an image under each magnification, the apparatus comprising:

an acquiring module configured to acquire a current magnification of the video camera;

a first table looking-up module configured to search for upper and lower aperture limits corresponding to the current magnification in the first corresponding relationship based on the current magnification;

an aperture value adjusting module configured to adjust a current aperture value to be within a range of the upper and lower aperture limits corresponding to the current magnification if the current aperture value exceeds the found range of the upper and lower aperture limits; and an exposure time and gain adjusting module configured to adjust exposure time and gain based on the adjusted aperture value to meet requirements of image brightness.

Comparing the embodiments of this invention with prior arts, the main distinctions and their effects are:

The present invention adjusts aperture to be within aperture ranges corresponding to an optimal depth of field according to different scene magnifications in order to acquire the optimal depth of field, and accordingly adjusts shutter and gain, so that the optimal depth of field can be reached while the optimal brightness is ensured to improve image quality.

Further, on the basis of the aperture value control, the length of the exposure time is further controlled based on the magnification, and different exposure time limits are made under different magnifications, especially lengthening the exposure time in a monitoring scene with a large magnification, which effectively solves the problem of image jittering caused by too short exposure time.

Further, on the basis of the aperture value control, the length of the exposure time is further controlled based on the speed of the motion object in a scene, shortening the exposure time in a scene with a motion object of high speed, which effectively avoids vehicle's tailing caused by too long exposure time.

Further, controlling the aperture to some extent in low brightness environment of evening ensures that the aperture size would not be maximum, prevents the depth of field decreasing, and solves the problem of image blurring.

BRIEF DESCRIPTION OF DRAWINGS

FIG. 3 is a depth-of-field versus magnification table of the intelligent adjustment method for automatic exposure performed by a video camera in the first embodiment of the present invention.

FIG. 4 is a control flowchart of the AE algorithm in prior arts.

FIG. 5 is a structure diagram of an apparatus for intelligently adjusting aperture for automatic exposure in the fifth embodiment of the present invention.

DETAILED DESCRIPTION OF THE PREFERRED EMBODIMENTS

In the following description, many technical details are provided for readers to better understand the present application. However, it is understood by those ordinary skilled in the art that the technical solution claimed to be protected by those claims of the present application can also be realized even without these technical details and not based on various changes and modifications of the following embodiments.

For the purpose, technical solution and merits of the present invention to be clearer, the following will further describe the embodiments of the present invention in detail with reference to the accompanying drawings.

Term Explanation:

Shutter: Exposure time, and hereafter setting shutter equals to setting exposure time;

Exposure: Implementing changes of image brightness by driving aperture, shutter and gain so as to achieve the optimal brightness which can be identified by human eyes for different scenes;

Module variables: General name of aperture, shutter and gain;

Aperture count size: General expression of F1.6;

Aperture physical size: Actual opening and closing physical size of aperture.

Figure 1:
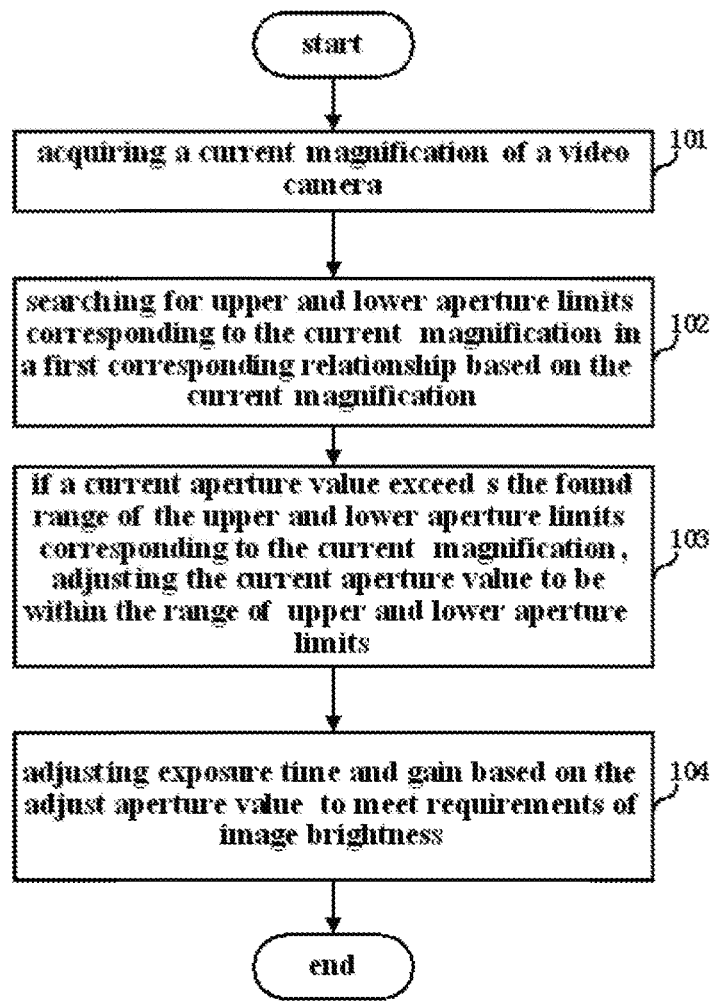
FIG. 1 is a flowchart of an intelligent adjustment method for automatic exposure performed by a video camera in the first embodiment of the present invention.

The first embodiment of the present invention relates to an intelligent adjustment method for automatic exposure performed by a video camera. A first corresponding relationship between magnifications and apertures is pre-set in the video camera of the intelligent adjustment method for automatic exposure performed by the video camera, and the first corresponding relationship records corresponding upper and lower aperture limits required for reaching the optimal depth of field of an image under each magnification. FIG. 1 is a flowchart of the intelligent adjustment method for automatic exposure performed by the video camera, and as shown in FIG. 1, the method comprises the following steps:

At step 101, a current magnification of a video camera is acquired.

Preferably, at this step, the current magnification is determined by a lens magnification feedback.

Then proceeds to step 102, upper and lower aperture limits corresponding to the current magnification in the first corresponding relationship is searched for based on the current magnification.

The upper and lower aperture limits in the first corresponding relationship can be expressed in the form of a proportion, and in other embodiments of the present invention, the aperture value ranges of the first corresponding relationship recorded by actual measurement can also be in other forms, not limited to the proportion form of the upper and lower aperture limits.

Then proceeds to step 103, a current aperture value is adjusted to be within a range of the upper and lower aperture limits, if the current aperture value exceeds the found range of the upper and lower aperture limits corresponding to the current magnification.

It should be understood that aperture, shutter and gain determine image brightness in current environment, and various combinations of the three can all achieve the optimal brightness. However, the combinations of the three are not necessarily optimal for different scenes in that factors for determining image quality of the video camera can be definition, depth of field and focus position, etc., wherein depth of field, focus position and signal-noise ratio, etc may be affected by the aperture. In terms of the depth of field, the optimal aperture values under certain magnification in certain environment can bring the optimal depth of field.

Then proceeds to step 104, exposure time and gain are adjusted based on the adjusted aperture value so as to meet requirements of image brightness.

The present invention adjusts aperture to be within an aperture range corresponding to an optimal depth of field according to different scene magnifications in order to acquire the optimal depth of field, and accordingly adjusts shutter and gain, so that the optimal depth of field can be reached while the optimal brightness is ensured to improve image quality.

Figure 2:
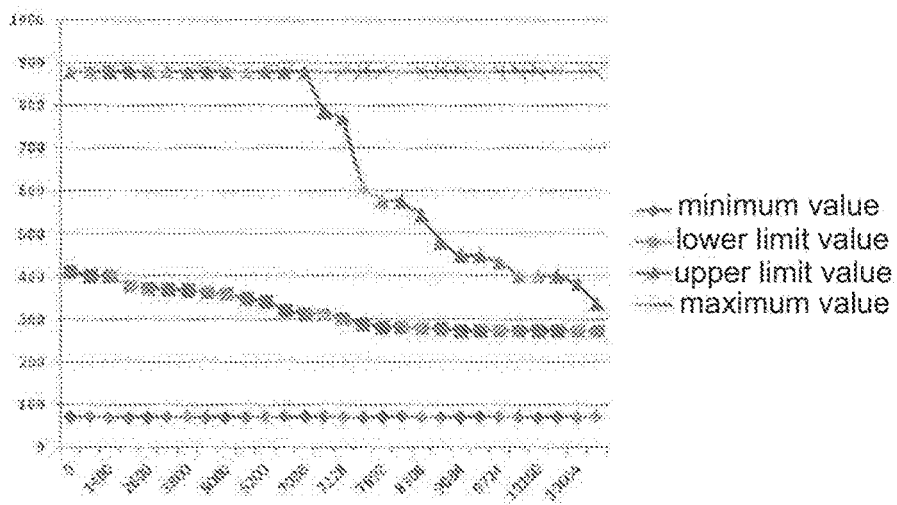
FIG. 2 is a depth-of-field versus magnification curve of the intelligent adjustment method for automatic exposure performed by a video camera in the first embodiment of the present invention.

As a preferable example of the present embodiment, the first corresponding relationship between magnifications and apertures pre-set in the video camera is a depth-of-field versus magnification curve or a depth-of-field versus magnification table. Pre-setting the depth-of-field versus magnification curve or the depth-of-field versus magnification table first requires determining an image corresponding effect of the optimal depth of field, analyzing images collected under different magnifications of the video camera, actually measuring aperture ranges corresponding to the optimal depth of field, recording a relationship between the aperture ranges of the optimal depth of field and the magnifications, and drawing the depth-of-field versus magnification curve or the depth-of-field versus magnification table. FIG. 2 is a depth-of-field versus magnification curve showing a relationship between magnifications and aperture ranges of the optimal depth of field. As shown in FIG. 2, as the magnification value increases, the upper aperture limit corresponding to the optimal depth of field decreases, the lower aperture limit corresponding to the optimal depth of field decreases, and the range reduces; as the magnification value decreases, the upper aperture limit corresponding to the optimal depth of field increases, the lower aperture limit corresponding to the optimal depth of field increases, and the range expands. And the algorithm would cause the aperture to be within the aperture ranges of the optimal depth of field in a scene exposure in order to reach the optimal depth of field.

FIG. 3 shows a corresponding depth-of-field versus magnification table, wherein the first column shows the data corresponding to the magnification information, the second column shows a proportion of lower limit value defined for the aperture, and the third column shows a proportion of upper limit value defined for the aperture. And these three groups of data information together constitute the depth-of-field versus magnification table.

The second embodiment of the present invention relates to an intelligent adjustment method for automatic exposure performed by a video camera which is improved based on the first embodiment, and improvements mainly lie in: a second corresponding relationship between magnifications and lower exposure time limits is pre-set in the video camera, and the step 104 of adjusting exposure time and gain based on the adjusted aperture value to meet requirements of image brightness further comprises the following sub-steps:

searching for a lower exposure time limit corresponding to the current magnification in the second corresponding relationship based on the current magnification;

judging whether a current exposure time is smaller than the lower exposure time limit;

adjusting the current exposure time to be not smaller than the lower exposure time limit if the current exposure time is smaller than the lower exposure time limit.

It should be understood that a problem of image jittering under a large magnification exists in the prior art mentioned above. This problem is rooted in the exposure time being too short, and within the same time period for example 1 ms, a motion displacement of an object in a scene with a large magnification is larger than that in a scene with a small magnification, so that the object positions' difference between image frame outputs is obvious, which appears as image jittering when frames are continuously played.

For this problem, on the basis of controlling the aperture value, the length of the exposure time is further controlled based on the magnification, and different exposure time limits are made under different magnifications, especially lengthening the exposure time in a monitoring scene with a large magnification, which effectively solves the problem of image jittering caused by too short exposure time.

The third embodiment of the present invention relates to an intelligent adjustment method for automatic exposure performed by a video camera which is improved based on the second embodiment, and improvements mainly lie in: a third corresponding relationship between speeds of a motion object and upper exposure time limits is pre-set in the video camera, and the step 104 of adjusting exposure time and gain based on the adjusted aperture value to meet requirements of image brightness further comprises the following sub-steps:

determining a speed of a motion object in current scene;

searching for an upper exposure time limit corresponding to the speed in the third corresponding relationship based on the speed of the motion object in current scene;

judging whether a current exposure time is larger than the upper exposure time limit;

adjusting the current exposure time to be not larger than the upper exposure time limit if the current exposure time is larger than the upper exposure time limit.

Preferably, in the sub-step of determining a speed of a motion object in current scene, the speed of the motion object in current scene is determined by processing image signals to obtain a difference between adjacent frames.

Additionally, it should be understood that in other embodiments of the present invention, other methods can also be utilized to obtain the speed of the motion object in current scene, not limited to the method above.

It should be understood that a problem of monitored vehicle's tailing in road scene exists in the prior art mentioned above. This problem is rooted in the exposure time being too long, and relative to an ordinary motion object scene, the motion speed of the vehicle is larger and the motion trail of the vehicle is longer within the same time period for example 10 ms, which appears as ghosting on the frame outputs and appears as vehicle's tailing when frames are continuously played, the larger the vehicle speed, more severe the tailing.

For this problem, on the basis of controlling the aperture value, the present embodiment further controls the length of the exposure time based on the speed of the motion object in a scene, shortening the exposure time in a scene with a motion object of high speed, which effectively avoids vehicle's tailing caused by too long exposure time.

Preferably, the present algorithm combines with ISP Image Processing to judge whether it is a scene with a motion object of high speed and would correspondingly prevent exposure time from being too long according to the scene, which effectively avoids the vehicle's tailing. Meanwhile interfaces for adjusting upper and lower exposure time limits are opened to users who can determine whether the exposure time should be longer or shorter for the monitored main application scene.

Scenes are described in the second and third embodiments above, one of which needs a long exposure time while the other of which needs a short exposure time, and the algorithm could make a reasonable judgment for both scenes and solves the problems.

The forth embodiment of the present invention relates to an intelligent adjustment for automatic exposure performed by a video camera which is improved based on the third embodiment, and improvements mainly lie in: an upper aperture threshold under low brightness is pre-set in the video camera, and before the step 104 of adjusting exposure time and gain based on the adjusted aperture value to meet requirements of image brightness, it further comprises the following steps:

judging whether a current environment brightness is lower than a predetermined low brightness threshold;

if yes, judging whether the current aperture value is larger than the upper aperture threshold under low brightness;

if the current aperture value is larger than the upper aperture threshold under lower brightness, adjusting the current aperture value to be not larger than the upper aperture threshold;

Preferably, in other embodiments of the present invention, judging the low brightness environment of evening can also be identified by a combination of aperture value, exposure time value and gain value, not limited to identification by judging whether the current environment brightness is lower than the predetermined low brightness threshold.

It can be understood that a problem of image blurring caused by too small depth of field of a scene in low brightness environment of evening exists in the prior art mentioned above. This problem is rooted in decreased illumination of evening, and the AE algorithm of existing video cameras compensates the image brightness preferentially by expanding the aperture, where the aperture's continuing expand leads to the depth of field decreasing which causes image blurring, meanwhile the change of the depth of field leads to that the focus position cannot be accurately determined which further aggravates image blurring.

For this problem, controlling the aperture to some extent in low brightness environment of evening ensures that the aperture size would not be maximum, prevents the depth of field decreasing, and solves the problem of image blurring.

As a preferable example of the present embodiment, based on the AE algorithm control logic, an algorithm control is implemented for maintaining optimal aperture and optimal exposure time of a camera in applications of different scenes and different magnifications, so that some common problems of existing monitoring equipment can be solved and image qualities can be optimized.

A control flow of the AE algorithm is shown in FIG. 4, and together five connecting points (marked as A, B, C, D, E from right to left and from up to down) are shown which indicate that the AE algorithm utilizes different control of module variables for different scenes when controlling aperture and shutter. Line AB represents a highlight environment for example light tube, where the shutter is fixed as ½₂₅₀₀ and the aperture range [F29, F9] is preferentially adjusted; line BC represents a medium-light environment for example outdoor sunny day, where the aperture is fixed as F9 and the range of shutter [½₂₅₀₀, ½₂₅₀] is preferentially adjusted; line CD represents a normal-light environment for example indoor daytime, where the shutter is fixed as ½₂₅₀ and the aperture range [F9, F3] is preferentially adjusted (wherein F3 is the lower aperture limit for a certain magnification of X times, and F9 is the upper aperture limit for the X times); line DE represents a low-brightness environment for example outdoor evening, where the aperture is fixed as F3 and the shutter range [½₂₅₀, ½₂₅] is preferentially adjusted. Then the whole control flow of AE is as such.

On this basis, this preferable example would intelligently adjust the variables at the connecting points shown in the above figure based on special scenes such as a road vehicle scene, a monitoring scene with a large magnification etc. For example, in the scene one of a monitoring scene with a large magnification, the connecting points A, B, C, D would move left to prevent the shutter being too fast in that too short exposure time would cause jittering of large magnification images; meanwhile the connecting points B and C would move upwardly to expand the depth of field of the image so as to improve the image quality (this part is also the core of the varying-magnification linkage, in which different aperture ranges are utilized for different magnifications to obtain the optimal depth of field, whose effect is especially obvious for a environment of a variety of scenes). And for example, in the scene two of a crossroad scene, the connecting points C, D, E would move right to prevent the shutter being too slow in that too long exposure time would cause monitored vehicle's tailing. The present algorithm runs in the framework shown in this flowchart and simultaneously loads a varying-magnification linkage module, etc, which optimizes the image quality and improves the algorithm for some existing problems.

It can be seen from the above control flow that intelligently identifying scenes is implemented at first in the present embodiment.

Relevant data information collected for a scene is recorded in real-time to identify the scene, for example the scene being determined by some methods such as a feedback of the video camera magnification determines the scene magnification, a combination of module variables determines whether the scene is daytime, night or evening, etc., and a difference between adjacent frames determines speeds of motion objects in the scene etc. Meanwhile, data statistics is performed by determined scenes and a depth-of-field versus magnification table required for the AE algorithm is collected, such as the depth-of-field versus magnification table shown in FIG. 3. The present algorithm is based on the above control principle and control logic, and uses an intelligent scene identifying module in this framework to synchronize scenes and modify the algorithm, which aims at improving the image quality.

Then intelligently adjusting the aperture is implemented based on the intelligently identified scenes:

1. Data introduction: aperture range is [minpwm, maxpwm]; shutter range is [minshut, maxshut] and corresponding exposure time range is [4 μs, 40 ms]; and magnification range is [0, 1000] and corresponding magnification is [0, 20 times].

Wherein, minpwm is corresponding minimum aperture value in the algorithm when the aperture is fully closed; maxpwm is corresponding maximum aperture value in the algorithm when the aperture is fully opened; minshut is the shortest exposure time, i.e. minimum shutter value; maxshut is the longest exposure time, i.e. maximum shutter value.

2. Algorithm idea: the present algorithm is based on the AE algorithm and belongs to a module in the AE algorithm. The present algorithm achieves an optimal image effect by adjusting aperture and shutter to realize optimal combinations of aperture and shutter for different magnifications, which is mainly reflected in aspects of the depth of field of image and the motion object's tailing.

3. Algorithm implementation: corresponding image effect of the optimal depth of field is determined, images are collected to analyze for different magnifications of the video camera, aperture ranges corresponding to the optimal depth of field are actually measured, a relationship between the aperture ranges of the optimal depth of field and magnifications is recorded, and a depth-of-field versus magnification table is drawn. Such module is added in the AE algorithm, which intelligently identifies a scene, analyzes the depth of field for the scene to determine the optimal aperture ranges in real-time, and assists in adjusting shutter and gain, so as to implement controlling the optimal depth of field by controlling the optimal variables of the aperture through AE, and this is implementation one; meanwhile judgment is made for the scene such as whether it is daytime or night, road or non-road scene to control the exposure time, which aims to solve the situation of vehicle's tailing as required, and this is implementation two, whose specific practice is to analyze whether it is a motion object scene by ISP image and to analyze whether it is a night scene by AE module variables, such that data is provided for the AE algorithm to implement controlling the exposure time.

The method embodiments of the present invention all can be realized by software, hardware and firmware etc. Regardless of the present invention is realized by software, or hardware, or firmware, the instruction codes can be stored in any type of computer accessible memory (such as permanent or can be modified, volatile or non-volatile, solid-state or non solid, fixed or replaceable medium etc.). Similarly, the memory can be, for example, programmable array logic (PAL), random access memory (RAM), programmable read only memory (PROM), read-only memory (ROM), electrically erasable programmable ROM (EEPROM), floppy disc, optical disc, and digital versatile disc (DVD) etc.

The fifth embodiment of the present invention relates to an apparatus for intelligently adjusting aperture for automatic exposure. FIG. 5 is a schematic diagram of the apparatus for intelligently adjusting aperture for automatic exposure.

In particular, a first corresponding relationship between magnifications and apertures is pre-set in the video camera having the apparatus for intelligently adjusting aperture for automatic exposure, and the first corresponding relationship records corresponding upper and lower aperture limits required for reaching the optimal depth of field of an image under each magnification. As shown in FIG. 5, the apparatus comprises the following modules:

an acquiring module configured to acquire a current magnification of a video camera;

a first table looking-up module configured to search for upper and lower aperture limits corresponding to the current magnification in the first corresponding relationship based on the current magnification;

an aperture value adjusting module configured to adjust a current aperture value to be within a range of the upper and lower aperture limits if the current aperture value exceeds the found range of the upper and lower aperture limits corresponding to the current magnification; and an exposure time and gain adjusting module configured to adjust exposure time and gain based on the adjusted aperture value so as to meet requirements of image brightness.

Furthermore, it should be understood that a problem of image jittering under a large magnification is rooted in the exposure time being too short, and within the same time period for example 1 ms, a motion displacement of an object in a scene with a large magnification is larger than that in a scene with a small magnification, so that the object positions' difference between image frame outputs is obvious, which appears as image jittering when frames are continuously played.

Preferably, in order to solve the above problem, a second corresponding relationship between magnifications and lower exposure time limits is pre-set in the video camera and the exposure time and gain adjusting module further comprises the following submodules:

a second table looking-up submodule configured to search for a lower exposure time limit corresponding to the current magnification in the second corresponding relationship based on the current magnification;

an exposure time up-adjusting submodule configured to judge whether a current exposure time is smaller than the lower exposure time limit and adjust the current exposure time to be not smaller than the lower exposure time limit if the current exposure time is smaller than the lower exposure time limit.

On the basis of controlling the aperture value, the length of the exposure time is further controlled based on the magnification, and different exposure time limits are made under different magnifications, especially lengthening the exposure time in a monitoring scene with a large magnification, which effectively solves the problem of image jittering caused by too short exposure time.

Additionally, it should be understood that a problem of monitored vehicle's tailing in road scene is rooted in the exposure time being too long, and relative to an ordinary motion object scene, the motion speed of the vehicle is larger and the motion trail of the vehicle is longer within the same time period for example 10 ms, which appears as ghosting on the frame outputs and appears as vehicle's tailing when frames are continuously played, the larger the vehicle speed, more severe the tailing.

Preferably, in order to solve the above problem, a third corresponding relationship between speeds of a motion object and upper exposure time limits is pre-set in the video camera, and the exposure time and gain adjusting module further comprises the following submodules:

a speed acquiring submodule configured to determine a speed of a motion object in current scene;

a third searching submodule configured to search for an upper exposure time limit corresponding to the speed in the third corresponding relationship based on the speed of the motion object in current scene;

an exposure time down-adjusting submodule configured to judge whether a current exposure time is larger than the upper exposure time limit and adjust the current exposure time to be not larger than the upper exposure time limit if the current exposure time is larger than the upper exposure time limit.

In this embodiment, the exposure time up-adjusting submodule and the exposure time down-adjusting submodule are implemented in the exposure time and gain adjusting module and both achieve the function of adjusting exposure time.

On the basis of controlling the aperture value, the length of the exposure time is further controlled based on the speed of the motion object in a scene, shortening the exposure time in a scene with a motion object of high speed, which effectively avoids vehicle's tailing caused by too long exposure time.

Moreover, it should be understood that a problem of image blurring caused by too small depth of field of a scene in low brightness environment of evening is rooted in decreased illumination of evening, and the AE algorithm of existing video cameras compensates the image brightness preferentially by expanding the aperture, where the aperture's continuing expand leads to the depth of field decreasing which causes image blurring, meanwhile the change of the depth of field leads to that the focus position cannot be accurately determined which further aggravates image blurring.

Preferably, in order to solve the problem mentioned above, an upper aperture threshold under low brightness is pre-set in the video camera and the aperture adjusting module further comprises an upper aperture limit adjusting module which comprises the following submodules:

a lower brightness judging submodule configured to judge whether a current environment brightness is lower than a predetermined lower brightness threshold;

an upper aperture limit adjusting submodule configured to judge whether the current aperture value is larger than the upper aperture threshold under lower brightness if the current environment brightness is lower than the predetermined lower brightness threshold, and adjust the current aperture value to be not larger than the upper aperture threshold if the current aperture value is larger than the upper aperture threshold under lower brightness, In other embodiments of the present disclosure, judging the low brightness environment of evening can also be identified by a combination of aperture value, exposure time value and gain value, not limited to identification by judging whether the current environment brightness is lower than the predetermined low brightness threshold.

Controlling the aperture to some extent in low brightness environment of evening ensures that the aperture size would not be maximum, prevents the depth of field decreasing, and solves the problem of image blurring.

The first, second, third and forth embodiments are the method embodiments corresponding to this embodiment, and this embodiment and the first, second, third and forth embodiments can be implemented in cooperation with each other. Correlated technical details disclosed in the first, second, third and forth embodiments are still effective in this embodiment and will not be repeated here in order to reduce duplication. Correspondingly, correlated technical details disclosed in this embodiment can also be applied in the first, second, third and forth embodiments.

The present disclosure has modified problems such as the depth of field due to self-adaptation for changes of scenes and magnifications by the AE algorithm, and uses the intelligent aperture adjusting module: aperture, shutter and gain of module properties determine the brightness in current environment, and various combinations of the three can all achieve the optimal brightness. However, the combinations of the three are not necessarily optimal for different scenes in that factors for determining image quality of the video camera can be definition, depth of field and focus position, etc., wherein depth of field, focus position and signal-noise ratio, etc. may be affected by the aperture. In terms of the depth of field, the optimal aperture values under certain magnification in certain environment can bring the optimal depth of field. The intelligent aperture adjusting module is used to adjust the aperture to be an aperture value corresponding to the optimal depth of field, meanwhile the depth of field may also ensure the clarity of focus at some degree. This module may be only a supplement in functions for the AE algorithm, but it has a great influence on the effects of the video camera and affects both AF and ISP. Thus, the present disclosure is a supplement to the software performance of the video camera.

It should be noted that units disclosed in each device embodiment of the present invention are logical units, on the physical, a logic unit can be a physical unit, and may be part of a physical unit, or implemented in combination of several physical units, and physical implementing methods for these logic units themselves are not the most important, the combination of the functions achieved by these logic units is the key to solving the technical problem disclosed in the present invention. Furthermore, in order to highlight innovative part of the present invention, the above device embodiments of the present invention do not introduce the units which are not related closely to solving the technical problem disclosed in the present invention, which does not indicate that the above device embodiments do not include other units.

It should be explained that in the Claims and Description of the present invention, relationship terms such as first, second etc are just utilized to distinguish one entity or manipulation from another entity or manipulation, instead of requiring or indicating any practical relation or sequence existing between these entities or manipulations. And, the terms "include", "comprise" or any other variant indicate to nonexclusive covering, thus the process, method, article or equipment including a series of elements not only includes those elements, but also includes other elements which are not definitely listed, or inherent elements of this process, method, article or equipment. Without more limitations, the element defined by the phrase "include a" does not exclude additional same elements existing in the process, method, article or equipment of this element.

By referring to some preferred embodiments of this invention, this invention has been illustrated and described. But it should be understood to those skilled in the art that various other changes in the forms and details may be made without departing from the principles and scope of the invention.

What is claimed is:

1. An intelligent adjustment method for automatic exposure performed by a video camera, wherein a first corresponding relationship between magnifications and apertures is preset in the video camera, and the first corresponding relationship records corresponding upper and lower aperture limits required for reaching an optimal depth of field of an image under each magnification, the intelligent adjustment method comprising:
   acquiring a current magnification of a video camera;
   searching for upper and lower aperture limits corresponding to the current magnification in the first corresponding relationship based on the current magnification;
   adjusting a current aperture value to be within a range of the upper and lower aperture limits corresponding to the current magnification if the current aperture value exceeds the found range of the upper and lower aperture limits; and
   adjusting exposure time and gain based on the adjusted aperture value to meet requirements of image brightness.

2. The intelligent adjustment method according to claim 1, wherein a second corresponding relationship between magnifications and lower exposure time limits is pre-set in the video camera, and the step of adjusting exposure time and gain based on the adjusted aperture value to meet requirements of image brightness further comprising:
   searching for a lower exposure time limit corresponding to the current magnification in the second corresponding relationship based on the current magnification;
   judging whether a current exposure time is smaller than the lower exposure time limit;
   adjusting the current exposure time to be not smaller than the lower exposure time limit if the current exposure time is smaller than the lower exposure time limit.

3. The intelligent adjustment method according to claim 1, wherein a third corresponding relationship between speeds of a motion object and upper exposure time limits is pre-set in the video camera, and the step of adjusting exposure time and gain based on the adjusted aperture value to meet requirements of image brightness further comprising:
   determining a speed of a motion object in current scene;
   searching for an upper exposure time limit corresponding to the speed in the third corresponding relationship based on the speed of the motion object in current scene;
   judging whether a current exposure time is larger than the upper exposure time limit;
   adjusting the current exposure time to be not larger than the upper exposure time limit if the current exposure time is larger than the upper exposure time limit.

4. The intelligent adjustment method according to claim 3, wherein in the step of determining a speed of a motion object in current scene, the speed of the motion object in current scene is determined via image signal processing to obtain a difference between adjacent frames.

5. The intelligent adjustment method according to claim 1, wherein an upper aperture threshold under lower brightness is pre-set in the video camera, and before the step of adjusting exposure time and gain based on the adjusted aperture value to meet requirements of image brightness, it further comprising:
   judging whether a current environment brightness is lower than a predetermined lower brightness threshold;
   if yes, judging whether the current aperture value is larger than the upper aperture threshold under lower brightness;
   if the current aperture value is larger than the upper aperture threshold under lower brightness, adjusting the current aperture value to be not larger than the upper aperture threshold.

6. The intelligent adjustment method according to claim 1, wherein in the step of acquiring a current magnification of a video camera, the current magnification is determined by a lens magnification feedback.

7. An intelligent adjustment apparatus for automatic exposure performed by a video camera, wherein a first corresponding relationship between magnifications and apertures is pre-set in the video camera, and the first corresponding relationship records corresponding upper and lower aperture limits required for reaching the optimal depth of field of an image under each magnification, and the apparatus comprising:
   a processor and a memory having computer-readable instructions that when executed by the processor performs a method, including: acquiring a current magnification of the video camera;
   searching for upper and lower aperture limits corresponding to the current magnification in the first corresponding relationship based on the current magnification;

adjusting a current aperture value to be within a range of the upper and lower aperture limits corresponding to the current magnification if the current aperture value exceeds the found range of the upper and lower aperture limits; and adjusting exposure time and gain based on the adjusted aperture value to meet requirements of image brightness.

8. The intelligent adjustment apparatus according to claim 7, wherein a second corresponding relationship between magnifications and lower exposure time limits is pre-set in the video camera, and the processor further:

searches for a lower exposure time limit corresponding to the current magnification in the second corresponding relationship based on the current magnification, judges whether a current exposure time is smaller than the lower exposure time limit and adjusts the current exposure time to be not smaller than the lower exposure time limit if the current exposure time is smaller than the lower exposure time limit.

9. The intelligent adjustment apparatus according to claim 7, wherein a third corresponding relationship between speeds of a motion object and upper exposure time limits is pre-set in the video camera, and the processor further:

determines a speed of a motion object in current scene, searches for an upper exposure time limit corresponding to the speed in the third corresponding relationship based on the speed of the motion object in current scene, judges whether a current exposure time is larger than the upper exposure time limit and adjusts the current exposure time to be not larger than the upper exposure time limit if the current exposure time is larger than the upper exposure time limit.

10. The intelligent adjustment apparatus according to claim 7, wherein an upper aperture threshold under lower brightness is pre-set in the video camera and the processor further judges whether a current environment brightness is lower than a predetermined lower brightness threshold, judges whether the current aperture value is larger than the upper aperture threshold under lower brightness if the current environment brightness is lower than the predetermined lower brightness threshold, and adjusts the current aperture value to be not larger than the upper aperture threshold if the current aperture value is larger than the upper aperture threshold under lower brightness.

* * * * *